United States Patent
Gota

(10) Patent No.: US 12,518,044 B2
(45) Date of Patent: Jan. 6, 2026

(54) ACCESS CONTROL APPARATUS, ACCESS CONTROL METHOD, AND PROGRAM

(71) Applicant: NEC Corporation, Tokyo (JP)

(72) Inventor: Kazufumi Gota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 18/718,126

(22) PCT Filed: Dec. 14, 2021

(86) PCT No.: PCT/JP2021/046019
§ 371 (c)(1),
(2) Date: Jun. 10, 2024

(87) PCT Pub. No.: WO2023/112140
PCT Pub. Date: Jun. 22, 2023

(65) Prior Publication Data
US 2025/0045440 A1    Feb. 6, 2025

(51) Int. Cl.
*G06F 21/62*    (2013.01)

(52) U.S. Cl.
CPC .. *G06F 21/6218* (2013.01); *G06F 2221/2141* (2013.01)

(58) Field of Classification Search
CPC .. G06F 2221/2141; G06F 21/57; G06F 21/62; G06F 21/6218
See application file for complete search history.

(56) References Cited

U.S. PATENT DOCUMENTS

| 2006/0117184 | A1 | 6/2006 | Bleckmann et al. |
| 2016/0140344 | A1 | 5/2016 | Sato et al. |
| 2017/0251013 | A1* | 8/2017 | Kirti ............ H04L 63/1441 |

(Continued)

FOREIGN PATENT DOCUMENTS

| JP | 2006-066982 A | 3/2006 |
| JP | 2008-522292 A | 6/2008 |

(Continued)

OTHER PUBLICATIONS

International Search Report for PCT Application No. PCT/JP2021/046019, mailed on Feb. 8, 2022.

(Continued)

*Primary Examiner* — Brian F Shaw

(57) ABSTRACT

An access control apparatus includes risk target list registration part which registers a dynamically fluctuating risk that has occurred during an operation of apparatus accessing system in a risk target list; trail information management part which collects and manages trail information concerning the apparatus which relates to the occurred risk from trail management server which manages trail information of a supply chain using block chain; score calculation part which calculates a score of the apparatus based on the risk registered in the risk target list and the trail information concerning the apparatus; determination part which determines a control method of an access by the apparatus to the system based on the score of the apparatus and a policy defining relationship between the score and the control method of an access; and control part which controls the access by the apparatus to system according to the control method of the access.

20 Claims, 8 Drawing Sheets

(56) References Cited

U.S. PATENT DOCUMENTS

| | | | |
|---|---|---|---|
| 2020/0228316 A1* | 7/2020 | Cahill | H04L 9/3297 |
| 2021/0004739 A1* | 1/2021 | Gill | G06Q 10/067 |
| 2021/0142237 A1 | 5/2021 | Niisato | |
| 2021/0326784 A1 | 10/2021 | Yoon et al. | |

FOREIGN PATENT DOCUMENTS

| | | |
|---|---|---|
| JP | 2019-510304 A | 4/2019 |
| JP | 2020-113281 A | 7/2020 |
| JP | 2021-002129 A | 1/2021 |
| JP | 2021-077220 A | 5/2021 |
| JP | 2021-511555 A | 5/2021 |
| WO | 2014/208427 A1 | 12/2014 |
| WO | 2020/194587 A1 | 10/2020 |

OTHER PUBLICATIONS

JP Office Action for JP Application No. 2023-567330, mailed on Nov. 12, 2024 with English Translation.

* cited by examiner

FIG. 4

| MAJOR TRAIL INFORMATION | PART INFORMATION (MANUFACTURING/DISTRIBUTION) 1010 | MANUFACTURING INFORMATION 1020 | DISTRIBUTION INFORMATION 1030 | OPERATION INFORMATION 1040 | MAINTENANCE INFORMATION 1050 | DISPOSAL INFORMATION 1060 |
|---|---|---|---|---|---|---|
| | PART INFORMATION<br>- MODEL NUMBER OF PART<br>- SERIAL NUMBER OF PART<br>- NAME OF MANUFACTURER<br>- DATE AND TIME OF MANUFACTURING,<br><br>DISTRIBUTION INFORMATION<br>- DATE AND TIME OF SHIPPING<br>- NAME OF DISTRIBUTION OPERATOR | HARDWARE INFORMATION<br>- NAME OF MANUFACTURER<br>- PRODUCT MODEL NUMBER<br>- SERIAL NUMBER OF PRODUCT<br>- MODEL NUMBER OF PART<br>- SERIAL NUMBER OF PART<br>- DATE AND TIME OF MANUFACTURING<br><br>SOFTWARE INFORMATION<br>- OS<br>- MW<br>- APPLICATION<br>- EACH DEVELOPMENT COMPANY NAME | OPERATION INFORMATION<br>- DATE AND TIME OF SHIPPING<br>- NAME OF DISTRIBUTION OPERATOR | SOFTWARE INFORMATION (AT TIME OF UPDATE)<br>- OS<br>- MW<br>- APPLICATION<br><br>OPERATION INFORMATION<br>- WORKING TIME | HARDWARE INFORMATION<br>- MODEL NUMBER OF PART<br>- SERIAL NUMBER OF PART<br><br>SOFTWARE INFORMATION<br>- OS<br>- MW<br>- APPLICATION<br><br>OPERATION INFORMATION<br>- DATE AND TIME OF MAINTENANCE<br>- NAME OF MAINTENANCE OPERATOR | OPERATION INFORMATION<br>- DATE AND TIME OF DISPOSAL |
| 2001 | 1011 | 1021 | 1031 | 1041 | 1051 | 1061 |

FIG. 7
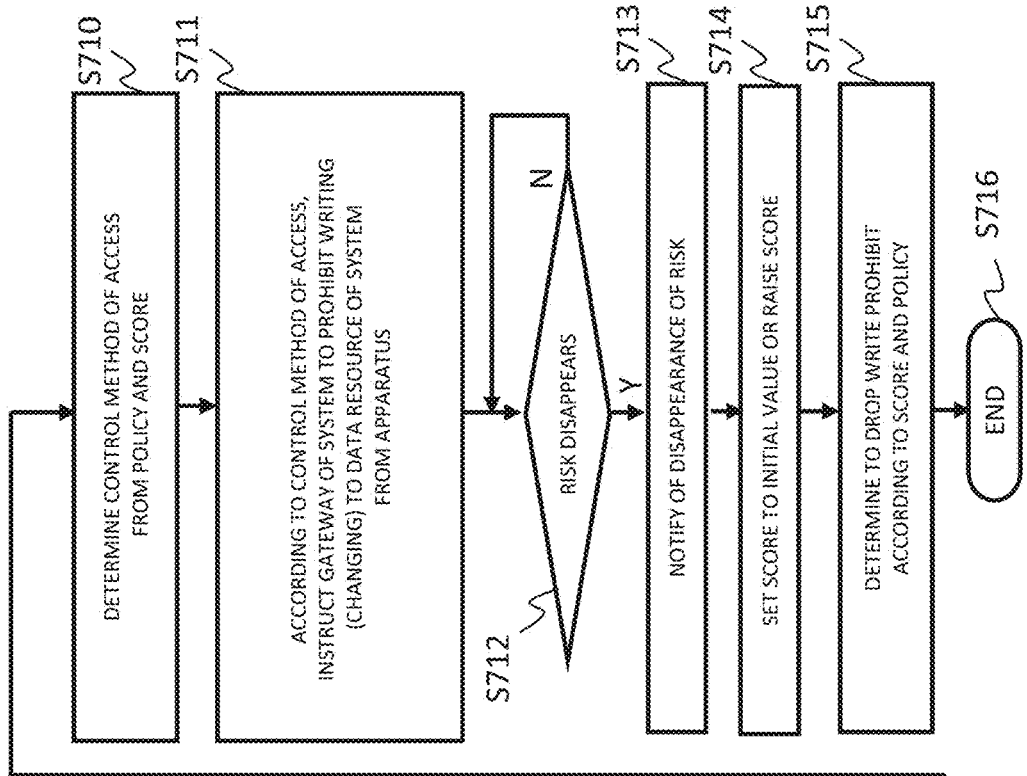
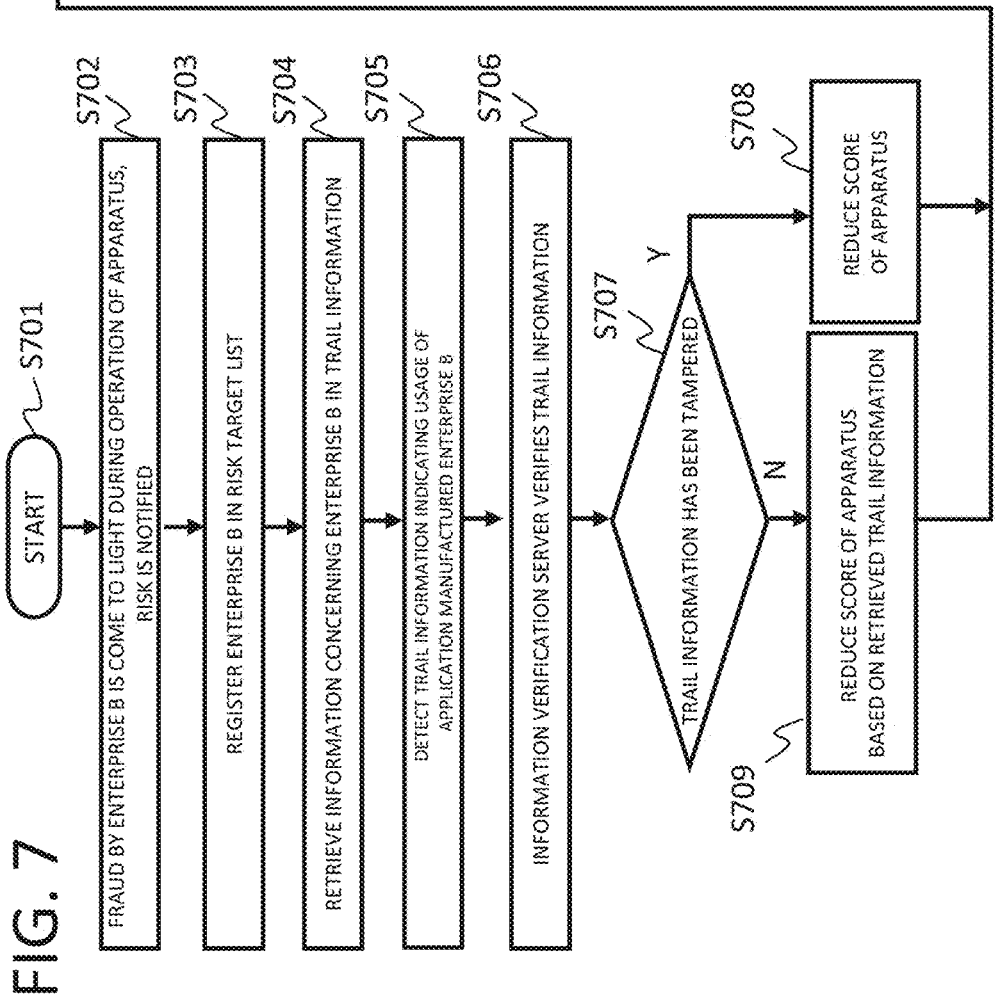

ACCESS CONTROL APPARATUS, ACCESS CONTROL METHOD, AND PROGRAM

This application is a National Stage Entry of PCT/JP2021/046019 filed on Dec. 14, 2021, the contents of all of which are incorporated herein by reference, in their entirety.

FIELD

The present invention relates to an access control apparatus, an access control method, and a program.

BACKGROUND

Reliability of an apparatus used in a system fluctuates dynamically according to international situation (a war, cyberterrorism, suspicion of spying, and so on) and enterprise risk (buyout, bankruptcy, data tampering, and so on). Originally, from a point of view of security in system operation, when reliability of an apparatus is dynamically reduced, an access from the apparatus connected to a system is to be dynamically restricted in line with reduction of the reliability. However, at present, there is no method for acquiring a correct information by going back a supply chain and dynamically applying the information to access control.

Patent Literature (PTL) 1 relates to an information processing apparatus which evaluates information security level of a supplier.

PTL 2 relates to a risk analysis method of a supply chain of suppliers.

PTL 3 relates to a management system for increasing efficiency of operation management of a computer system.

PTL 4 relates to a method for assisting quality management which manages failure information of products without tampering and so on occurred in a supply chain and identifies an extent of influence of the failure.

PTL 5 relates to a technology for discovering and managing security of an application.

PTL 1: WO2020/194587A1
PTL 2: Japanese Patent Kohyo Publication No: 2021-511555
PTL 3: Japanese Patent Kokai Publication No: 2021-0772220
PTL 4: Japanese Patent Kokai Publication No: 2021-002129
PTL 5: Japanese Patent Kohyo Publication No: 2019-510304

SUMMARY

The following analysis has been given by the present invention.

In a case as described above, it may not be possible to address assumed threat by using simple scoring. For example, it is unknown whether tampering of parts or apparatuses has been made at a time of manufacturing or distribution. If tampering is made, the parts and the apparatuses becomes to be not trustworthy. Furthermore, in a case where an application installed in an apparatus is currently operating without any problem and any problem is detected later, it may not be possible to determine an extent of the problem, an apparatus on which the application is running, and so on because of ambiguity. That is, when there are a plurality of supply chains, each information of manufacturing, distribution, operation, and maintenance becomes ambiguous in reliability under a situation in which things and persons involving therein respectively are multiply overlapped. Therefore, there is a need of a method for increasing reliability of as apparatus in an ambiguous situation to make a judgement.

In a conventionally used rule-based method, when there is a problem with several parts in an apparatus, a vulnerability of an application, or the like, shutdown of the apparatus or an access prohibition will occur. However, in an apparatus, there are a plurality of parts and applications manufactured by a plurality of manufacturers. Therefore, it is difficult to flatly determine that there is a problem due to a vulnerability level and an influence rate thereof. For example, if there is only one part manufactured by a manufacturer whose reliability is decreased (although the part itself has no problem), continuity of use is highly likely. However, if similar problems occur in a lot of parts, it becomes necessary to shut down the apparatus. Similarly, concerning an application itself, it may be difficult to determine whether it can be used or not used (OK/NG) even if there is a minor problem which is not a bug. In this way, it is not possible to make a comprehensive judgement by using a conventional rule-based method because there are complex elements, such as, reliability of manufacturers, how many parts and applications of the manufactures are used, and an influence rate to a user who uses them, and so on.

For example, it is assumed that parts manufactured by a plurality of companies in a country A are used in terms of quality and price. At one moment, even if a political decision is made that there is a risk of information leakage due to occurrence of suspicion of spying in a country A, it may be difficult to investigate whether or not a system uses an apparatus in which parts made in country A are incorporated.

Furthermore, for example, it is assumed that a software of company C is used because of performance and name recognition and data tampering of a product sold by a company C is come to light. The company C is now investigating this and it is not clear whether software in use is a target of data tampering. In such a case, it may be difficult to determine presence/absence of influence to the software (it is a target but a function using is not affected, or it is necessary to stop using it, etc.) until the company C makes an announcement.

Furthermore, for example, since a person responsible for testing an apparatus is not fixed, it is assumed that testing is performed by a less-experienced person D and an experienced person E. Although a result of testing has no problem, for example, there is a risk of a careless mistake for the testing performed by the person E due to an empirical value and an attention is necessary. However, it may be difficult to determine an empirical value.

It is an object of the present invention to provide an access control apparatus, an access control method, and a program which contribute to understand whether or not an apparatus can be used continuously as a numerical value even if a fluctuating risk occurs during an operation of an apparatus.

According to a first aspect of the present invention, there is provided an access control apparatus, comprising:

a risk target list registration part which registers a dynamically fluctuating risk that has occurred during an operation of an apparatus accessing a system in a risk target list;

a trail information management part which collects and manages trail information concerning the apparatus which relates to the occurred risk from a trail management server which manages trail information of a supply chain using a block chain;

a score calculation part which calculates a score of the apparatus based on the risk registered in the risk target list and the trail information concerning the apparatus;

a determination part which determines a control method of an access by the apparatus to the system based on the score of the apparatus and a policy defining relationship between the score and the control method of an access; and a control part which controls the access by the apparatus to the system according to the control method of the access.

According to a second aspect of the present invention, there is provided an access control method performed by a computer comprising a processor and a memory, comprising:

registering a dynamically fluctuating risk that has occurred during an operation of an apparatus accessing a system in a risk target list;

collecting and managing trail information concerning the apparatus which relates to the occurred risk from a trail management server which manages trail information of a supply chain using a block chain;

calculating a score of the apparatus based on the risk registered in the risk target list and the trail information concerning the apparatus;

determining a control method of an access by the apparatus to the system based on the score of the apparatus and a policy defining relationship between the score and the control method of an access; and controlling the access by the apparatus to the system according to the control method of the access.

According to a third aspect of the present invention, there is provided a program which causes a computer to perform processings of:

registering a dynamically fluctuating risk that has occurred during an operation of an apparatus accessing a system in a risk target list;

collecting and managing trail information concerning the apparatus which relates to the occurred risk from a trail management server which manages trail information of a supply chain using a block chain;

calculating a score of the apparatus based on the risk registered in the risk target list and the trail information concerning the apparatus;

determining a control method of an access by the apparatus to the system based on the score of the apparatus and a policy defining relationship between the score and the control method of an access; and controlling the access by the apparatus to the system according to the control method of the access. Note, this program can be recorded in a computer-readable storage medium.

The storage medium can be non-transitory one, such as a semiconductor memory, a hard disk, a magnetic recording medium, an optical recording medium, and so on. The present invention can be realized by a computer program product.

According to the present invention, it is possible to provide an access control apparatus, an access control method, and a program which contribute to understand whether or not an apparatus can be used continuously as a numerical value even if a fluctuating risk occurs during an operation of an apparatus.

BRIEF DESCRIPTION OF DRAWINGS

FIG. 4 is a diagram illustrating an example of trail information of a supply chain to be stored in a trail management server according to the first example embodiment of the present invention.

FIG. 7 is a flow chart illustrating an example of an outline of an operation of an access control apparatus according to the second example embodiment of the present invention.

EXAMPLE EMBODIMENTS

Figure 1:
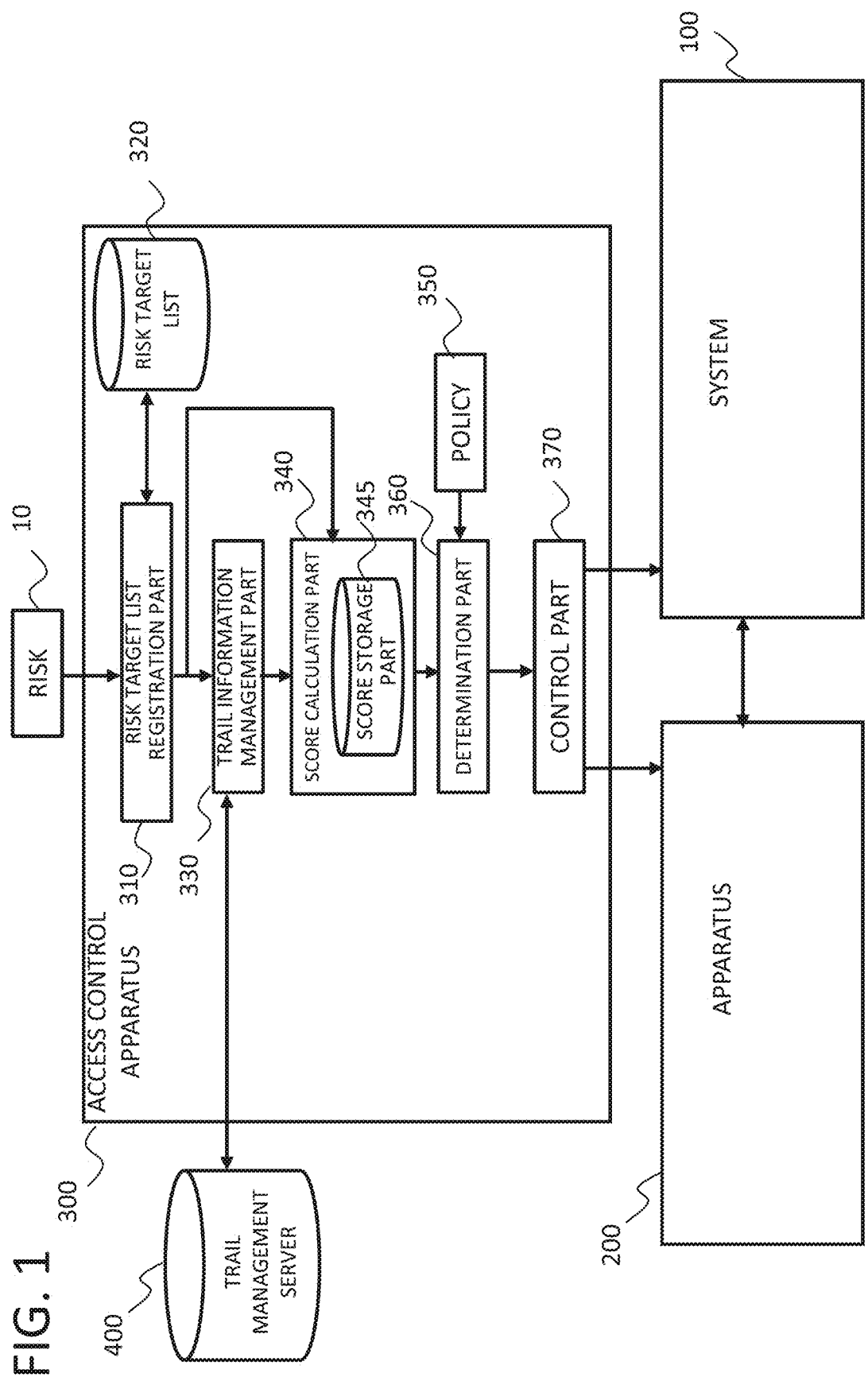
FIG. 1 is a diagram illustrating an example of a configuration of an access control apparatus according to an example embodiment of the present invention.

First, an outline of an example embodiment of the present invention will be described with reference to drawings. Note, in the following outline, reference signs of the drawings are denoted to each element as an example for the sake of convenience to facilitate understanding, however, the present invention is not limited thereto. An individual connection line between blocks in the drawings, etc., referred to in the following description includes both one-way and two-way directions. A one-way arrow schematically illustrates a principal signal (data) flow and does not exclude bidirectionality.

FIG. 1 is a diagram illustrating an example of a configuration of an access control apparatus (a policy engine) 300 according to an example embodiment of the present invention. The access control apparatus 300 according to the example embodiment of the present invention includes a risk target list registration part 310, a trail information management part 330, a score calculation part 340, a determination part 360, a control part 370, a risk target list 320 and a policy 350. The score calculation part 340 includes a score storage part 345 which stores a calculated score. The score storage part 345 may be provided outside the score calculation part 340 or outside the access control apparatus 300 in a case where the score storage part 345 can be referred to by the score calculation part 340.

The risk target list registration part 310 registers a dynamically fluctuating risk 10 that has occurred during an operation of an apparatus 200 accessing a system 100 in a risk target list 320. Note, the risk target list 320 is not only included in the access control apparatus 300 but also may be arranged in a server outside the access control apparatus 300 which can be referred to from the access control apparatus 300. The trail information management part 330 collects and manages trail information concerning the apparatus 200 which relates to the occurred risk 10 from a trail management server 400 which manages trail information of a supply chain using a block chain. The score calculation part 340 calculates a score (reliability score) of the apparatus 200 based on the risk 10 registered in the risk target list 320 and the trail information concerning the apparatus and stores the score in the score storage part 345. As an example, a score is a score value which is described to information of a supply chain. The determination part 360 determines a control method of an access by the apparatus 200 to the system 100 based on the score of the apparatus 200 stored in the score storage part 345 and a policy 350 defining relationship between the score and the control method of an access. The control part 370 controls the access by the apparatus 200 to the system 100 according to the determined control method of the access.

A score and an access method may be defined in advance by a policy 350. As an example, by a policy 350, it is possible to define below.

In a case where a score is less than or equal to 80, a system 100 is instructed to remove write permission to a particular database (DB) concerning the apparatus 200.

In a case where a score is less than or equal to 50, the apparatus 200 is restricted in such way that an access to a particular system (server) 100 is only allowed (an IP address is restricted).

In a case where a score is less than or equal to 25, the apparatus 200 is caused not to connect the system 100 (enforce a certificate) and is caused to require manual re-registration. A policy 350 described above is one example and it is possible to use other definition. Furthermore, it is possible to change a definition of a policy 350 during an operation of the apparatus 200 to review appropriateness and behavior of a score value.

There is an advantage of management of an apparatus using a score (reliability score) of an apparatus according to the example embodiment of the present invention below. For example, in a case where parts and software in an apparatus is managed using as judgement items of basic parts ad software, such as a serial number of an apparatus (identifier),
a serial number of a part being used (identifier),
a name of software being used, and so on, it is not possible to determine a risk even if stable supply of parts or quality of software is affected, when there is a possibility of occurrence of a risk by a manufacturer or a supplier of parts or software or when the risk has occurred.

In contrast, in addition to the above judgement items, by using a score (reliability score) of an apparatus calculated from information fluctuating day by day (risk), that is, business condition of a sales/manufacturing company, an excellence level, a condition of a country of manufacturing or distribution information (risk), such as information on a sales/manufacturing country of parts and software (an economic condition, a security situation, etc.),
information on a sales/manufacturing company of parts and software (an economic condition, an excellence level, etc.),
distribution information of parts and software (a transport method, date and time of transport), and so on, it becomes possible to reduce a risk of a security. For example, if a security situation is good and a company is good, it can be determined that stable supply of parts, software, and so on and quality thereof are guaranteed. Furthermore, if transportation is carried out by a predefined route, date and time, it can be determined that storage and management is ensured, whereby parts, software, and so on can be used.

According to the example embodiment of the present invention, it is possible to provide an access control apparatus 300 which can understand whether or not an apparatus 200 can be used continuously as a numerical value and control an access to a system 100 by the apparatus 200 even if a fluctuating risk 10 occurs during an operation of an apparatus 200, by using a score (reliability score) of the apparatus 200 calculated from complex elements of trail information of a supply chain managed by a trail management server 400 using a block chain.

First Example Embodiment

Figure 2:
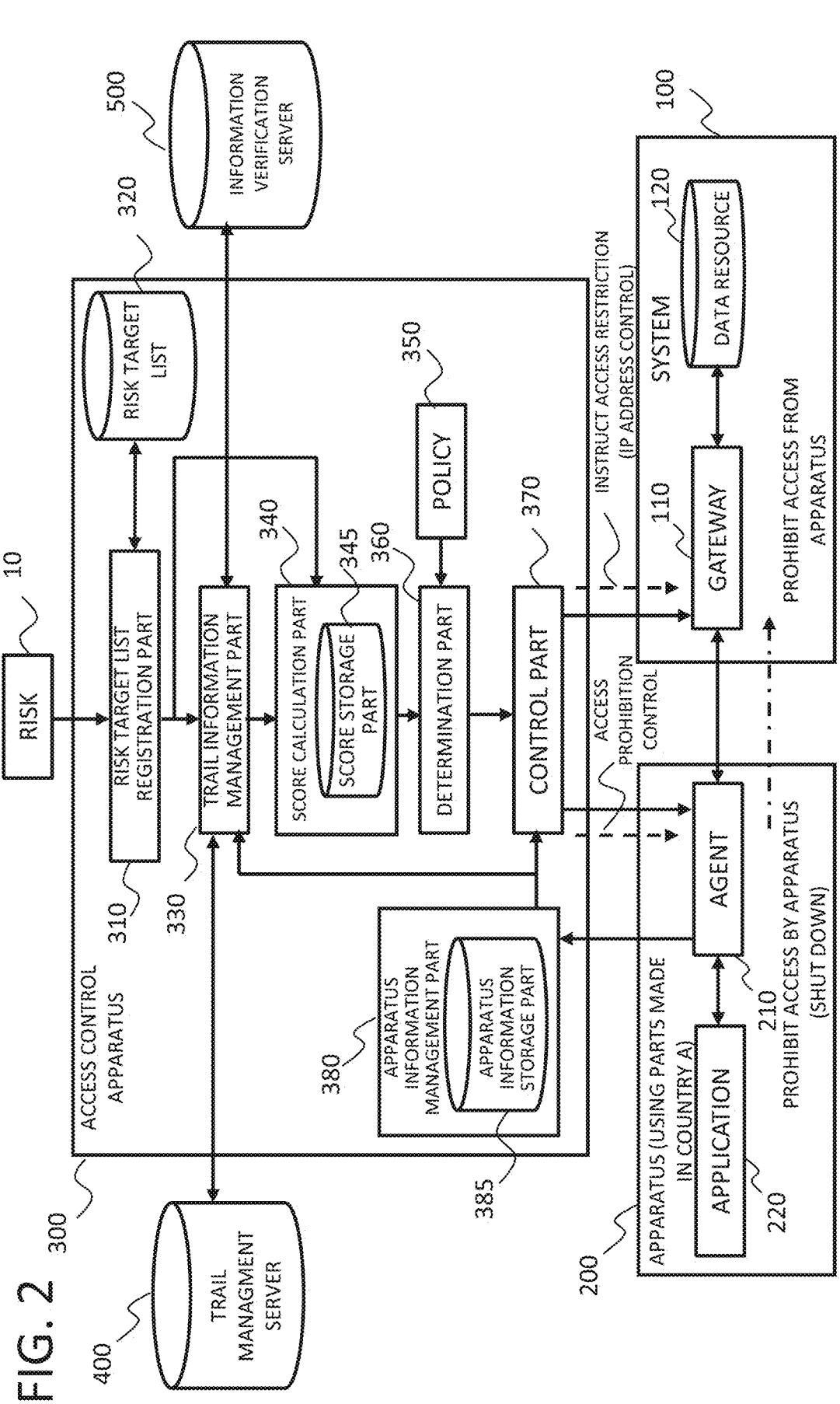
FIG. 2 is a diagram illustrating an example of a configuration of an access control apparatus according to a first example embodiment of the present invention.

Next, a first example embodiment of the present invention will be described with reference to drawings. FIG. 2 is a diagram illustrating an example of a configuration of an access control apparatus (a policy engine) 300 according to a first example embodiment of the present invention, a system 100, and an apparatus 200. In FIG. 2, components denoted by the same reference numerals as those in FIG. 1 indicate the same components, and description thereof will be omitted.

With reference to FIG. 2, an example of a configuration of an access control apparatus 300 according to the first example embodiment of the present invention will be described. The access control apparatus 300 according to the first example embodiment of the present invention includes a risk target list registration part 310, a trail information management part 330, a score calculation part 340, a determination part 360, a control part 370, an apparatus information management part 380, a risk target list 320 and a policy 350. The score calculation part 340 includes a score storage part 345 which stores a calculated policy. As an example, a score is a score value which is described to information of a supply chain, and it is assumed that, in an initial state, the score is set to, for example, an initial value of 100. The score storage part 345 may be provided outside the score calculation part 340 or outside the access control apparatus 300 in a case where the score calculation part 340 can refer to the score storage part 345.

The apparatus information management part 380 includes an apparatus information storage part 385. The apparatus information storage part 385 may be provided outside the apparatus information management part 380 or outside the access control apparatus 300 in a case where the apparatus information management part 380 can refer to the apparatus information storage part 385.

FIG. 2 illustrates an example of a case where an apparatus 200 uses parts manufactured in a country A. With reference to FIG. 2, for example, the apparatus 200 includes an agent 210 an dan application 220.

A control program of the agent 210 is secured in a secure area and the agent 210 collects a variety of pieces of information of the apparatus 200, such as, for example, a product model number, a serial number of a product, a MAC address, an IP address, software information (for example, OS, application, and so on), and so on and transmits them to the access control apparatus 300. Furthermore, the agent 210 can autonomically control an access for an output from the apparatus 200 and an input to the apparatus 200 according to an instruction by the access control apparatus 300. Furthermore, the agent 210 can control an access of the apparatus 200 to the system 100 according to an instruction by the system 100.

The apparatus information management part 380 as described above, for example, receives a variety of pieces of information, such as a product model number, a serial number of a product, a MAC address, an IP address, software information (for example, OS, application, and so on), and so on from the agent 210 of the apparatus 200, and stores them in the apparatus information storage part 385 as apparatus information.

The system 100 includes, for example, a gateway 110 and a data resource 120. The gateway 110 controls an access to the data resource 120 from the apparatus 200 according to an instruction by the access control apparatus 300.

Next, a trail management server 400 which cooperates with the access control apparatus 300 according to the first example embodiment of the present invention will be described. The trail management server 400 manages part information of the apparatus 200, for example, date and time of manufacturing, a manufacturer name, and so on, and part information, such as a part name to be assembled in the apparatus at the time of manufacturing of the apparatus 200, software information, and a person responsible of each supply chain, and manages the same information for operation and maintenance. Furthermore, the trail management server 400 manages verification result by an information verification server 500 and it is possible to share information among respective supply chains.

Figure 3:
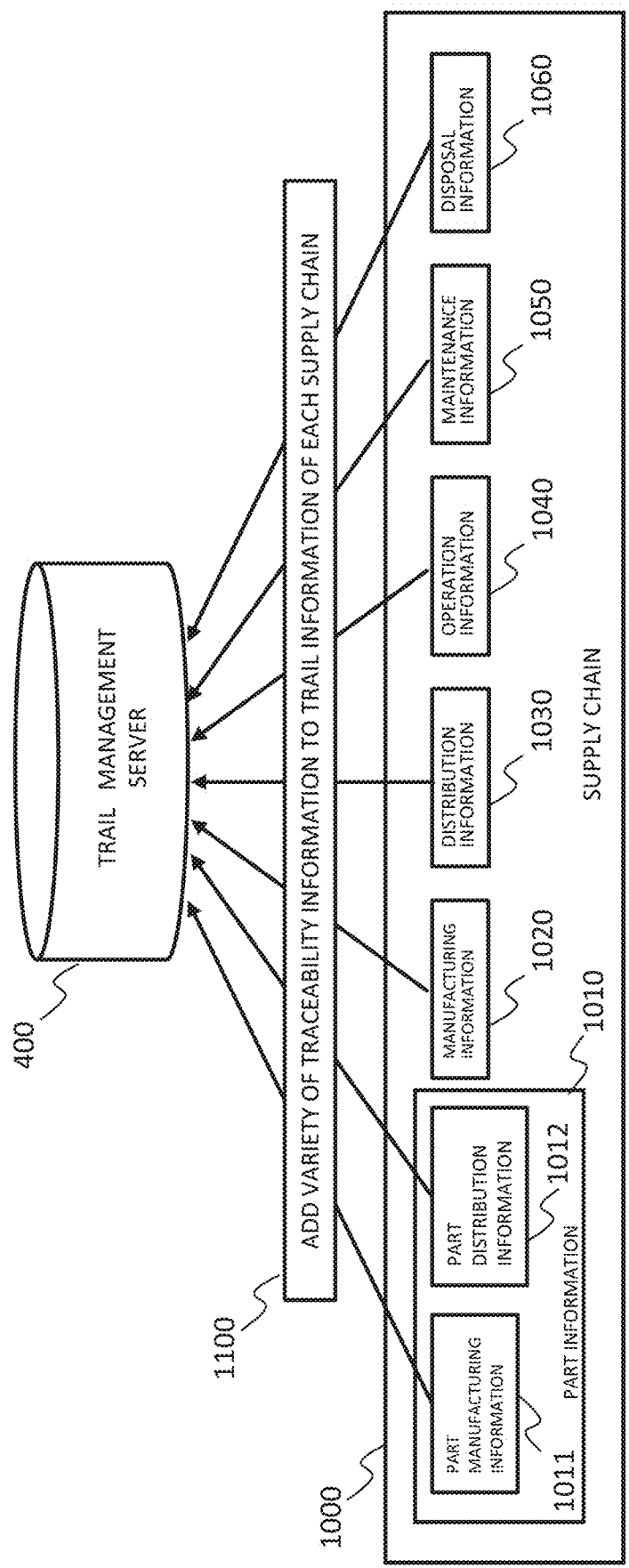
FIG. 3 is a diagram illustrating an example of an outline of storing to manage trail information of a supply chain in a trail management server according to the first example embodiment of the present invention using a block chain.

FIG. 3 is a diagram illustrating an example of an outline of storing to manage trail information of each supply chain 1000 in a trail management server 400 which cooperates with the access control apparatus 300 according to the first example embodiment of the present invention using a block chain. With reference to FIG. 3, the trail management server 400 stores and manages trail information groups of the apparatus 200 inputted from each supply chain 1000, such as part information 1010, manufacturing information 1020, distribution information 1030, operation information 1040, maintenance information 1050, and disposal information 1060, using a block chain by adding a variety of pieces of traceability information 1100 to each trail information. One example of the traceability information is a hash value concerning a previously store block and so on in a case of a block chain. A hash value concerning a previously store block and so on is added to a block to be newly store and may be stored in a trail managing server. In addition, the part information 1010 may further include part manufacturing information 1011 and part distribution information 1012. Each trail information may be manually stored in the trail management server 400 or may be stored by automated collection of a system. Furthermore, the trail management server 400 can store and manage result of verification by an information verification server 500 to share information among each supply chain 1000.

FIG. 4 is a diagram illustrating an example of trail information 2000 of a supply chain 1000 to be stored in a trail management server 400 cooperating with the access control apparatus 300 according to the first example embodiment of the present invention. With reference to FIG. 4, each column represents trail information inputted from each supply chain 1000, such as part information 1010, manufacturing information 1020, distribution information 1030, operation information 1040, maintenance information 1050, and disposal information 1060, and so on. A row of major trail information 2001 represents an example of concrete contents stored for each trail information.

For example, as to an example of part information 1010, as a variety of pieces of information for parts, that is, as part information, a model number of part, a serial number of a part, a name of a manufacturer, date and time of manufacturing, and so on are described, and as distribution information, date and time of shipping and a name of a distribution operator, and so on are described.

In the first example embodiment of the present invention, it is assumed that the part information 1010 of the trail information of a supply chain of the apparatus 200 store the trail management server 400 describes a name of a manufacturer of a country A as a name of a manufacturer.

Next, an information verification server 500 cooperating with the access control apparatus 300 of the first example embodiment of the present invention will be described. The information verification server 500 performs verification of information stored in the trail management server 400 and information in a TPM (Trusted Platform Module) in the apparatus 200 and returns a response of a result of verification, that is, presence or absence of tampering of information to the access control apparatus 300. The information verification server 500 may be a database server of an outside third party (completeness information database/vulnerability database of an application, and so on), and so on, such as, for example, a service of not made in-house but an outside resource.

As to determining presence/absence of tampering by the information verification server 500, for example, information (including a hash value) stored in the trail management server 400 using a block chain is registered in the information verification server 500, and then, it becomes possible to determine presence/absence of tampering when the information (including a hash value) in the trail management server 400 is transmitted to the information verification server 500 again.

Next, in a case where a country A itself becomes to be a target of a risk, an operation of an access control apparatus 300 according to the first example embodiment of the present invention to prohibit use of an apparatus 200 which uses parts manufactured in the country A from being used will be described with reference to drawings.

Figure 5:
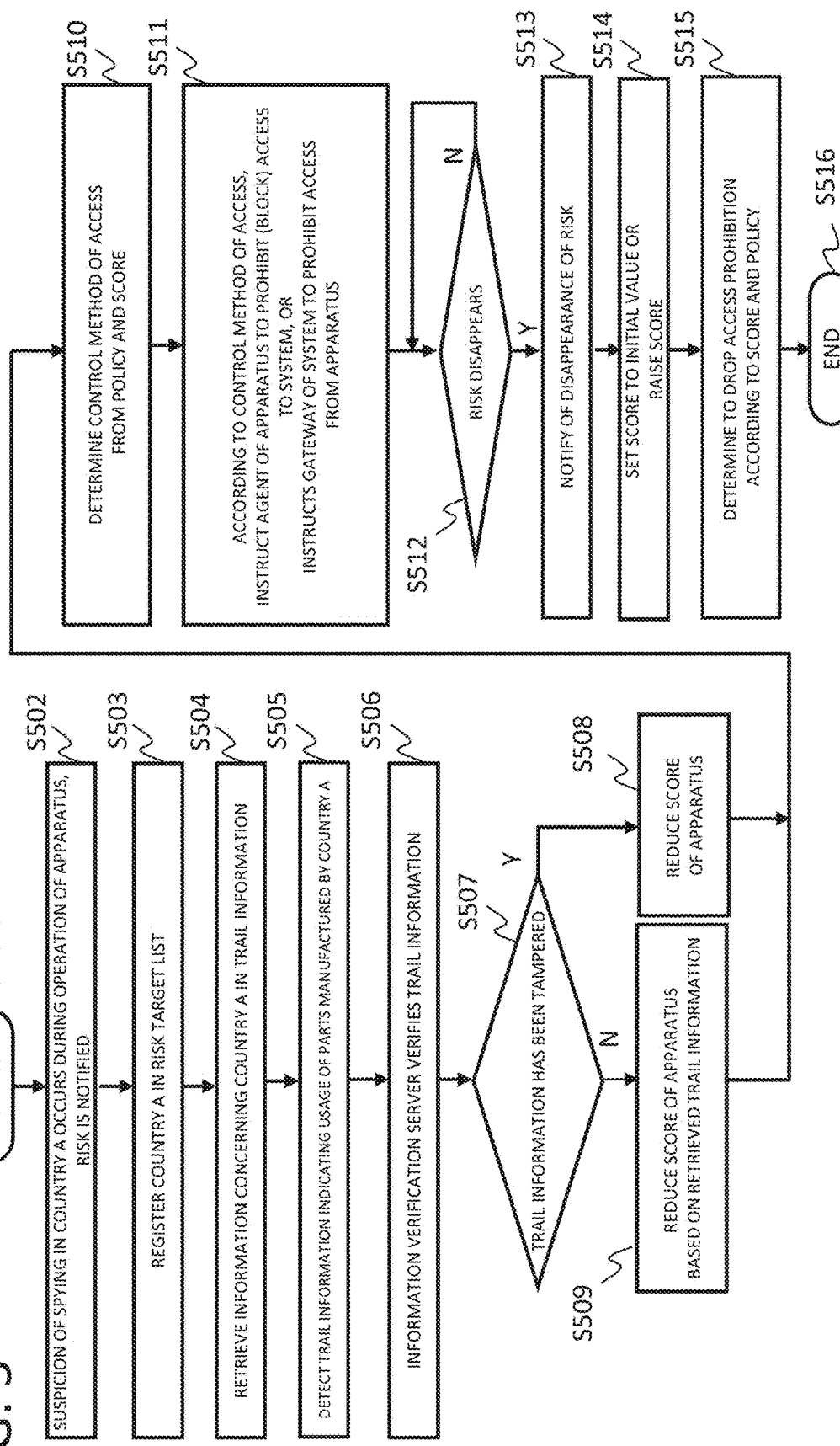
FIG. 5 is a flow chart illustrating an example of an outline of an operation of an access control apparatus according to the first example embodiment of the present invention.

FIG. 5 is a flow chart illustrating an example of an outline of an operation of an access control apparatus 300 according to the first example embodiment of the present invention.

The flowchart as shown in FIG. 5 starts at step S501.

A case where suspicion of spying in a country A occurs during an operation of an apparatus 200, whereby the country A itself becomes to be a target of a risk will be described below. Because the country A itself has become to be a target of a risk, a risk 10 is notified an access control apparatus 300 (step S502).

A risk target list registration part 310 registers the country A in a risk target list 320 (step S503). As an example, a score reduction point for the country A, for example 50 points, may be registered in the risk target list 320.

A trail information management part 330 receives information concerning the country A, such as a score reduction point for the country A, registered in the risk target list 320 from the risk target list registration part 310, identifies an apparatus 200 according to apparatus information stored in an apparatus information storage part 385 (for example, a product model number, a serial number of a product, a MAC address, an IP address, software information (for example, OS, application, and so on), and so on), and accesses the trail management server 400 to retrieve information concerning the country A concerning the apparatus 200, for example, part information 1010, manufacturing information 1020, and so on (step S504).

Because a name of a manufacturer of the country A is described as a name of a manufacturer in the part information 1010 of trail information of a supply chain of the apparatus 200 stored in the trail management server 400, the trail information management part 330 detects the name of the manufacturer of the country A as trail information which indicates that the apparatus 200 uses parts manufactured in the country A (step S505).

The trail information management part 330 transmits the detected trail information indicating that the parts manufactured in the country A are being used to the information verification server 500. The information verification server 500 verifies whether or not the trail information has been tampered and returns a verification result to the trail information management part 330 (step S506).

A score calculation part 340 receives the verified trail information concerning the apparatus 200 from the trail information management part 330, receives information concerning the country A, such as a score reduction point for the country A registered in the risk target list 320 from the risk target list registration part 310, and calculates a score of the apparatus 200.

Note, the score storage part 345 of the score calculation part 340 stores a score calculated by the score calculation part 340. As an example, a score is a score value which is described for information of a supply chain and it is assumed that the score has an initial value of, for example, 100 at an initial state. Note, a value 0 (zero) may be assigned to an initial value of the score and the score may be increased as a risk correspondingly increases by using a score increase point for the country A in place of a score reduction point.

As an example, the score calculation part 340 calculates a score of the apparatus 200 by reducing a score from an initial value when there is a risk for the apparatus 200. Note, as an example, if a risk is resolved, a score may be set to an initial value or a score may be increased by a predetermined value, as described later.

In a case where it is determined that trail information has been tampered in a verification result concerning the apparatus 200 received from the trail information management part 330, for example, in a case where date and time of manufacturing in the part information 1010 has been tampered (step S507 Y), the score calculation part 340 reduces a score of the apparatus 200 and stores a new score in the score storage part 345 (step S508).

On the other hand, in a case where it is determined that trail information has not been tampered (step S507 N) in a verification result concerning the apparatus 200 received from the trail information management part 330, the score calculation part 340 reduces a score of the apparatus 200 based on the retrieved trail information and stores a new score in the score storage part 345 (step S509).

As an example, in a case where "a name of a manufacturer (including a country)" is a target of a risk or a target of a risk of a security policy of an enterprise using the apparatus 200, the score calculation part 340 reduces a score and stores a new score in the score storage part 345.

Note, as to a security policy of an enterprise using the apparatus 200, it is considered that there is a case where there is an influence for an enterprise using the apparatus or there is another case where there is no influence for another enterprise using the apparatus. Therefore, it is necessary to incorporate an own decision of the enterprise using the apparatus 200. For example, it may be possible to set a security policy of an enterprise using the apparatus in such way that a risk is high in a case where a function of a part residing in the apparatus 200 is utilized but there is no influence in a case where the function thereof is not utilized.

As another example, it is assumed that, in a case of a risk 10 at this time, although there is no problem for a manufacturer manufacturing a part in the country A, but the whole country A becomes to be a risk target and whereby use of all the goods (materials, products) are prohibited. In such case, the score calculation part 340, for example, may reduce 50 points which is registered in the risk target list 320 as a score reduction point for the country A from an initial value of 100 and set a score to be 50 to store in the score storage part 345.

Next, a determination part 360 receives a score of the apparatus 200 (for example, the score 50 as described above) stored in the score storage part 345 from the score calculation part 340 and determines a control method of an access by the apparatus 200 to the system 100 based on a policy 350 defining relationship between a score and a control method of an access (step S510).

As an example, it is possible to set a policy 350 as described above in such way that in a case where a score is less than or equal to 50, the apparatus 200 is restricted that an access to a particular system (server) 100 is only allowed (an IP address is restricted). According to this setting, as a method of controlling an access from the apparatus 200 to the system 100, an access prohibition from the apparatus 200 to the system 100 is determined. Note, in a case where a value 0 (zero) may be assigned to an initial value of the score and the score may be increased as a risk correspondingly increases by using a score increase point for the country A in place of a score reduction point, the policy 350 is also to be set correspondingly.

Next, a control part 370 identifies an apparatus 200 according to apparatus information stored in the apparatus information storage part 385 (for example, a product model number, a serial number of a product, a MAC address, an IP address, software information (for example, OS, application, and so on), and so on), and, according to the determined control method of the access, the control part 370 instructs an agent 210 of the apparatus 200 to prohibit (block) an access to the system 100 or instructs a gateway 110 of the system to prohibit access from the apparatus 200 (step S511). For example, use of the apparatus 200 itself (access to the system 100) may be prohibited or an access right (access to a data resource 120, a function of operation restriction, or the like) may be set to the gateway 110 of the system or the agent 210 of the apparatus 200. In a case where a risk is resolved, as an example, a score may be set to an initial value or may be increased by a predetermined value.

As described above, in a case where a risk 10 occurs during an operation of an apparatus 200, it is possible to control the access by the apparatus 200 to the system 100.

Next, as long as a risk exists, it is monitored whether or not the risk disappears (step S512 N). For example, in a case where a risk 10 disappears in such way that suspicion of spying in a country A is resolved (step S512 Y), the access control apparatus 300 may be notified of disappearance of the risk 10, the risk target list registration part 310 may remove the registration of the risk 10 in the risk target list 320, and the score calculation part 340 may be notified of the disappearance of the risk from the risk target list registration part 310 (step S513).

When the score calculation part 340 receives a notification indicating the disappearance of the risk, the score calculation part 340 sets a score to an initial value or raises a score by a predetermined value to store the score in the score storage part 345 (step S514).

Because the score is set to an initial value or raised by a predetermined value, the determination part 360 determines to drop an access prohibition according to a score and a policy 350 and the control part 370 drops the access prohibition from the apparatus 200 to the system 100 (step S515).

The flow chart as shown in FIG. 5 ends at step S516.

At a time when a next risk occurs or a risk dynamically fluctuates, the operations from step S501 to S516 are repeated. In this way, it is possible to perform an operation and a management of the apparatus 200 by utilizing trail information of a supply chain against a dynamically fluctuating risk occurred during operation of the apparatus 200 accessing to the system 100.

As described above, according to an access control apparatus 300 of the first example embodiment of the present invention, it is possible to provide an access control apparatus 300 which contributes to understand whether or not an apparatus 200 can be used continuously as a numerical value even if a fluctuating risk occurs during an operation of an apparatus 200.

Second Example Embodiment

Figure 6:
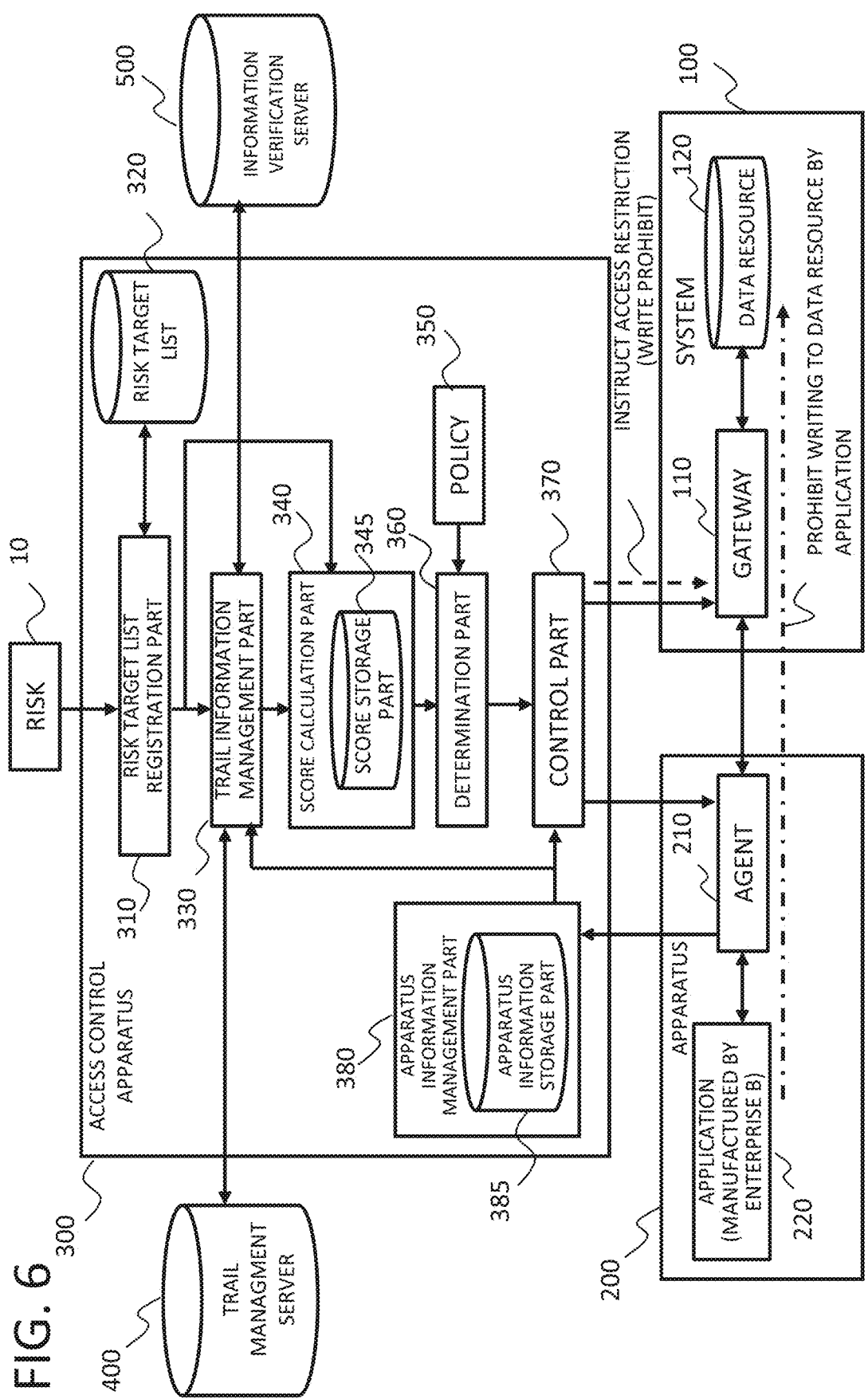
FIG. 6 is a diagram illustrating an example of a configuration of an access control apparatus according to a second example embodiment of the present invention.

Next, an access control apparatus according to a second example embodiment of the present invention will be described with reference to drawings. FIG. 6 is a diagram illustrating an example of a configuration of an access control apparatus 300 according to the second example embodiment of the present invention. In FIG. 6, components denoted by the same reference numerals as those in FIG. 2 indicate the same components, and description thereof will be omitted.

An operation in a case where the access control apparatus 300 according to the second example embodiment of the present invention prohibits use of an application 220 developed by an enterprise B in a case where fraud by an enterprise B, such as data tampering, tampering of sales record on business, and so on, is come to light, during an operation of an apparatus 200 on which the application 220 developed by the enterprise B is loaded, will be described with reference to drawings.

Note, with reference to FIG. 4, in the second embodiment of the present invention, it is assumed that an enterprise B is described in a manufacturing information 1020 in trail information of a supply chain of an apparatus 200 stored in the trail management server 400 as a development company name for software information.

FIG. 7 is a flow chart illustrating an example of an outline of an operation of an access control apparatus 300 according to the second example embodiment of the present invention.

The flowchart as shown in FIG. 7 starts at step S701.

A case in which fraud by the enterprise B, such as data tampering, tampering of sales record on business, and so on, is come to light, during an operation of an apparatus 200, whereby the enterprise B becomes to be a target of a risk will be described below. Because the enterprise B has become to be a risk target, a risk 10 is notified an access control apparatus 300 (step S702).

A risk target list registration part 310 registers the enterprise B in a risk target list 320 (step S703). As an example, a score reduction point of the enterprise B, for example 20 points, may be registered in the risk target list 320.

A trail information management part 330 receives information concerning the enterprise B, such as a score reduction point for the enterprise B, registered in the risk target list 320 from the risk target list registration part 310, identifies an apparatus 200 according to apparatus information stored in an apparatus information storage part 385 (for example, a product model number, a serial number of a product, a MAC address, an IP address, software information (for example, OS, application, and so on), and so on), and accesses the trail management server 400 to retrieve information concerning the enterprise B for the apparatus 200, for example, a self-developed product, a product which the enterprise B is selling, or the like (step S704).

Because the enterprise B is described as a development company name of software information in the production information 1020 of trail information of a supply chain of the apparatus 200 stored in the trail management server 400, the trail information management part 330 detects the development company name of the enterprise B as trail information which indicates that the apparatus 200 uses application 220 manufactured by the enterprise B (step S705).

The trail information management part 330 transmits the detected trail information indicating use of the application 220 manufactured by the enterprise B to the information verification server 500. The information verification server 500 verifies whether or not the trail information has been tampered and returns a verification result to the trail information management part 330 (step S706).

A score calculation part 340 receives the verified trail information concerning the apparatus 200 from the trail information management part 330, receives information concerning the enterprise B, such as a score reduction point for the enterprise B registered in the risk target list 320 from the risk target list registration part 310, and calculates a score of the apparatus 200.

Note, the score storage part 345 of the score calculation part 340 stores a score calculated by the score calculation part 340. As an example, a score is a score value which is described for information of a supply chain and it is assumed that the score has an initial value of, for example, 100 at an initial state. Note, a value 0 (zero) may be assigned to an initial value of the score and the score may be increased as a risk correspondingly increases by using a score increase point for the enterprise B in place of a score reduction point.

As an example, the score calculation part 340 calculates a score of the apparatus 200 by reducing a score from an initial value when there is a risk for the apparatus 200. Note, as an example, when a risk is resolved, a score may be set to an initial value or increased by a predetermined value, as described later.

In a case where it is determined that trail information has been tampered in a verification result concerning the apparatus 200 received from the trail information management part 330, for example, in a case where software information of production information 1020 has been tampered (step S707 Y), the score calculation part 340 reduces a score of the apparatus 200 and stores a new score in the score storage part 345 (step S708).

On the other hand, in a case where it is determined that trail information has not been tampered (step S707 N) in a verification result concerning the apparatus 200 received from the trail information management part 330, the score calculation part 340 reduces a score of the apparatus 200 based on the retrieved trail information and stores a new score in the score storage part 345 (step S709).

As an example, in a case where "software information (including a development company and a country)" and so on is a target of a risk or a target of a risk of a security policy of an enterprise using the apparatus 200, the score calculation part 340 reduces a score and stores a new score in the score storage part 345.

Note, as to a security policy of an enterprise using the apparatus 200, it is considered that there is a case where there is an influence for an enterprise using the apparatus or there is another case where there is no influence for another enterprise using the apparatus. Therefore, it is necessary to incorporate an own decision of the enterprise using the apparatus200. For example, it may be possible to set a security policy of an enterprise using the apparatus in such way that a risk is high in a case where a function of an application 220 residing in the apparatus 200 is utilized but there is no influence in a case where the function thereof is not utilized.

As another example, it is assumed that, in a case of a risk 10 at this time, although there is no problem for an application manufactured by the enterprise B, but it becomes to be a risk target in a case where reliability of the enterprise B reduces. In such case, the score calculation part 340, for example, may reduce 20 points which is registered in the risk target list 320 as a score reduction point for the enterprise B from an initial value of 100 and set a score to be 80 to store in the score storage part 345.

Next, a determination part 360 receives a score of the apparatus 200 (for example, the score 80 as described above) stored in the score storage part 345 from the score calculation part 340 and determines a control method of an access by the apparatus 200 to the system 100 based on a policy 350 defining relationship between a score and a control method of an access (step S710).

As an example, it is possible to set a policy 350 as described above in such way that in a case where a score is less than or equal to 80, the system 100 is instructed that write permission to a particular database (DB) concerning the apparatus 200 is removed. According to this setting, as a method of controlling an access from the apparatus 200 to the system 100, a write prohibition from an application 220 of the apparatus 200 to the system 100 is determined. Note, in a case where a value 0 (zero) may be assigned to an initial value of the score and the score may be increased as a risk correspondingly increases by using a score increase point for the enterprise B in place of a score reduction point, the policy 350 is also to be set correspondingly.

Next, a control part 370 identifies an apparatus 200 according to apparatus information stored in the apparatus information storage part 385 (for example, a product model number, a serial number of a product, a MAC address, an IP address, software information (for example, OS, application, and so on), and so on), and, according to the determined control method of the access, the control part 370 instructs a gateway 110 of the system to prohibit writing to (changing) the data resource 120 from the application 220 of the apparatus 200 (step S711). Note, referencing to the data resource 120 of the system 100 may be remained as it is possible. Note, as described later, when fraud by the enterprise B is resolved, writing to (changing) the data resource may become possible by returning a score.

As described above, in a case where a risk 10 occurs during an operation of an apparatus 200, it is possible to control the access by the apparatus 200 to the system 100.

Next, as long as a risk exists, it is monitored whether or not the risk disappears (step S712 N). For example, in a case where a risk 10 disappears in such way that the fraud of the enterprise B is resolved (step S712 Y), the access control apparatus 300 may be notified of disappearance of the risk 10, the risk target list registration part 310 may remove the registration of the risk 10 in the risk target list 320, and the score calculation part 340 may be notified of the disappearance of the risk from the risk target list registration part 310 (step S713).

When the score calculation part 340 receives a notification indicating the disappearance of the risk, the score calculation part 340 sets a score to an initial value or raises a score by a predetermined value to store the score in the score storage part 345 (step S714).

Because the score is set to an initial value or raised by a predetermined value, the determination part 360 determines to drop a write prohibition to a data resource 120 according to a score and a policy 350 and the control part 370 drops the write prohibition from the apparatus 200 to the data resource 120 of the system 100 (step S715).

The flow chart as shown in FIG. 7 ends at step S716.

At a time when a next risk occurs or a risk dynamically fluctuates, the operations from step S701 to S716 are repeated. In this way, it is possible to perform an operation and a management of the apparatus 200 by utilizing trail information of a supply chain against a dynamically fluctuating risk occurred during operation of the apparatus 200 accessing to the system 10.

As described above, according to an access control apparatus 300 of the second example embodiment of the present invention, it is possible to provide an access control apparatus 300 which contributes to understand whether or not an apparatus 200 can be used continuously as a numerical value even if a fluctuating risk occurs during an operation of an apparatus 200.

The example embodiments of the present invention have been described as above, however, the present invention is not limited thereto. Further modifications, substitutions, or adjustments can be made without departing from the basic technical concept of the present invention. For example, the configurations of the system and the elements and the representation modes of the message or the like illustrated in the individual drawings are merely used as examples to facilitate the understanding of the present invention. Thus, the present invention is not limited to the configurations illustrated in the drawings. In addition, "A and/or B" in the following description signifies at least one of A or B.

Figure 8:
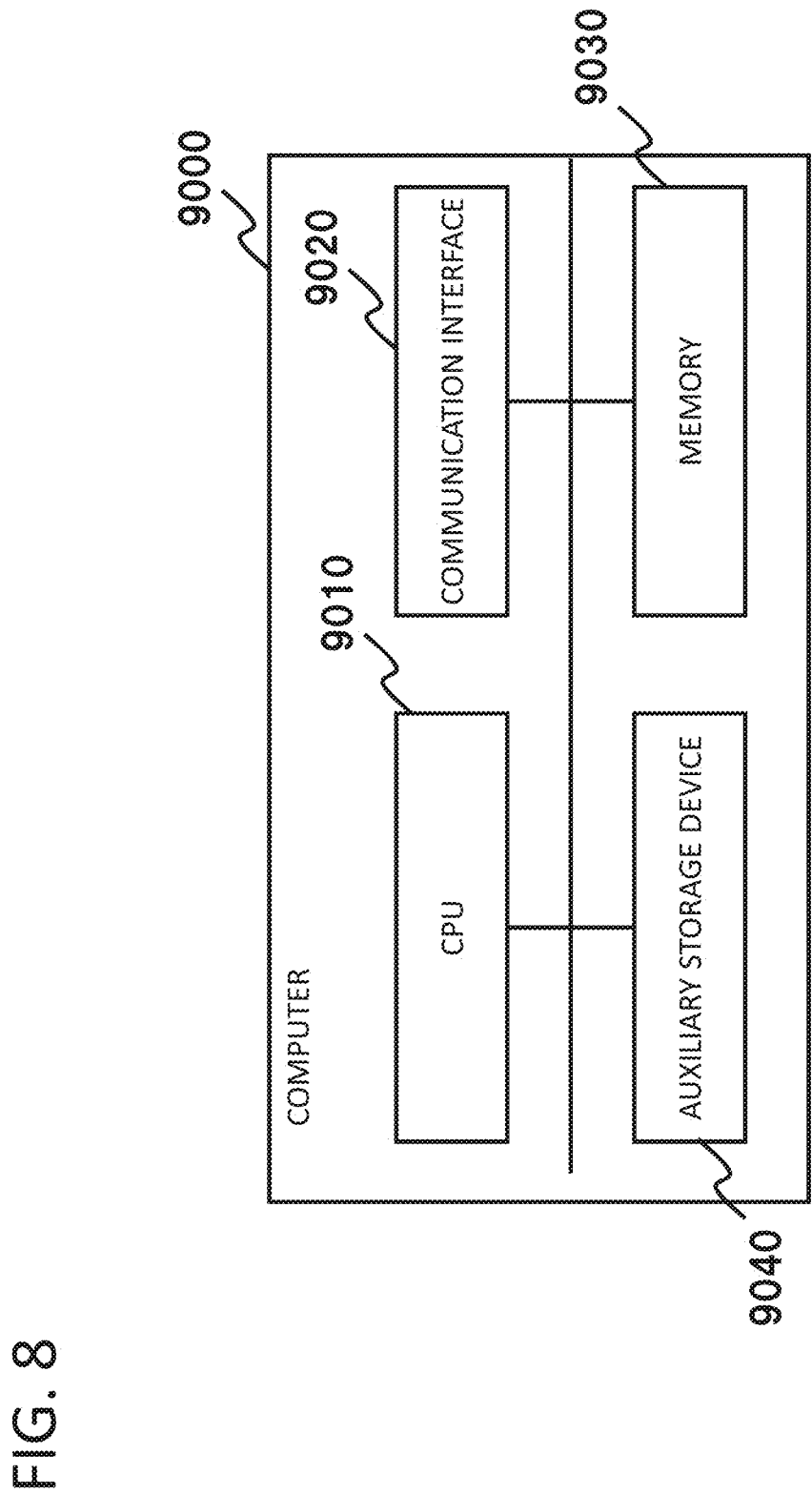
FIG. 8 is a diagram illustrating a configuration of a computer which can make up an access control apparatus of the present invention.

In addition, the procedures described in the above first to second example embodiments can each be realized by a program causing a computer (9000 in FIG. 8) functioning as the access control apparatus 300 to realize the functions as the access control apparatus 300. For example, this computer is configured to include a CPU (Central Processing Unit) 9010, a communication interface 9020, a memory 9030, and an auxiliary storage device 9040 in FIG. 8. That is, the CPU 9010 in FIG. 8 executes an access control program and performs processing for updating various calculation parameters stored in the auxiliary storage device 9040 or the like.

The memory 9030 is a RAM (Random Access Memory) or a ROM (Read-Only Memory), and so on.

That is, the individual parts (processing means, functions) of each of the access control apparatus in the first to second example embodiments as described above can each be realized by a computer program that causes a processor of the computer to execute the corresponding processing described above by using corresponding hardware.

Finally, suitable modes of the present invention will be summarized.

Mode 1

(See the access control apparatus according to the above first aspect)

Mode 2

The access control apparatus according to mode 1 is preferable that, wherein when it is determined by an information verification server which performs a verification of information determines that the trail information concerning the apparatus is not tampered, the score calculation part calculates the score of the apparatus by updating the score of the apparatus in such way that a difference from an initial value becomes large when the trail information concerning the apparatus is a target of the risk registered in the risk target list.

Mode 3

The access control apparatus according to mode 1 is preferable that, wherein when it is determined by an information verification server which performs a verification of information determines that the trail information concerning the apparatus is tampered, the score calculation part calculates the score of the apparatus by updating the score of the apparatus in such way that a difference from an initial value becomes large.

Mode 4

The access control apparatus according to mode 2 or 3 is preferable that, wherein the score calculation part sets the initial value to the score when the risk has disappeared, and wherein the control part removes the control of the access to the system by the apparatus.

Mode 5

The access control apparatus according to any one of modes 1 to 4, further comprising: an apparatus information management part which receives apparatus information from the apparatus and manages the apparatus information; and is preferable that, wherein the control part and the trail information management part determine the apparatus according to the apparatus information.

Mode 6

The access control apparatus according to any one of modes 1 to 5 is preferable that,
wherein the policy prescribes the control method of an access to the system for the score by the apparatus.

Mode 7

The access control apparatus according to any one of mode 1 to 6 is preferable that,
wherein the system comprises a gateway and a data resource; and
wherein the control part instructs the gateway to allow to control the access to the data resource by the apparatus according to the control method of the access.

Mode 8

The access control apparatus according to any one of modes 1 to 7 is preferable that,
wherein the apparatus comprises an application and an agent to control the application; and
wherein the control part instructs the agent to allow to control the access to the system according to the control method of the access.

Mode 9

(See the access control method according to the above second aspect)

Mode 10

(See the program according to the above third aspect)
The above modes 9 and 10 can be expanded to the modes 2 to 8 in the same way as the mode 1 is expanded.

The disclosure of each of the above PTLs is incorporated herein by reference thereto. Modifications and adjustments of the example embodiments or examples are possible within the scope of the overall disclosure (including the claims) of the present invention and based on the basic technical concept of the present invention. Various combinations or selections of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be construed to have been concretely disclosed.

REFERENCE SIGNS LIST

10 risk
100 system
110 gateway
120 data resource
200 apparatus
210 agent
220 application
300 access control apparatus
310 risk target list registration part
320 risk target list
330 trail information management part
340 score calculation part
345 score storage part
350 policy
360 determination part
370 control part
380 apparatus information management part
385 apparatus information storage part
400 trail management server
500 information verification server
1000 supply chain
2000 trail information
9000 computer
9010 CPU
9020 communication interface
9030 memory
9040 auxiliary storage device

What is claimed is:
1. An access control apparatus, comprising:
at least a processor; and
a memory in circuit communication with the processor,
wherein the processor is configured to execute program instructions stored in the memory to perform:
registering a dynamically fluctuating risk that has occurred during an operation of an apparatus accessing a system in a risk target list;
collecting and managing trail information concerning the apparatus which relates to the occurred risk from a trail management server which manages trail information of a supply chain using a block chain;
calculating a score of the apparatus based on the risk registered in the risk target list and the trail information concerning the apparatus;

determining a control method of an access by the apparatus to the system based on the score of the apparatus and a policy defining relationship between the score and the control method of an access; and
controlling the access by the apparatus to the system according to the control method of the access.

2. The access control apparatus according to claim 1, wherein when it is determined by an information verification server which performs a verification of information determines that the trail information concerning the apparatus is not tampered, the calculating comprises calculating the score of the apparatus by updating the score of the apparatus in such way that a difference from an initial value becomes large when the trail information concerning the apparatus is a target of the risk registered in the risk target list.

3. The access control apparatus according to claim 1, wherein when it is determined by an information verification server which performs a verification of information determines that the trail information concerning the apparatus is tampered, the calculating comprises calculating the score of the apparatus by updating the score of the apparatus in such way that a difference from an initial value becomes large.

4. The access control apparatus according to claim 2, wherein the calculating comprises setting the initial value to the score when the risk has disappeared, and
wherein the controlling comprises removing the control of the access to the system by the apparatus.

5. The access control apparatus according to claim 1, wherein the processor is configured to execute program instructions stored in the memory to perform:
receiving apparatus information from the apparatus and managing the apparatus information;
wherein the controlling and the collecting and managing comprise determining the apparatus according to the apparatus information.

6. The access control apparatus according to claim 1, wherein the policy prescribes the control method of an access to the system for the score by the apparatus.

7. The access control apparatus according to claim 1, wherein the system comprises a gateway and a data resource; and
wherein the controlling comprises instructing the gateway to control the access to the data resource by the apparatus according to the control method of the access.

8. The access control apparatus according claim 1, wherein the apparatus comprises an application and an agent to control the application; and
wherein the controlling comprises instructing the agent to control the access to the system according to the control method of the access.

9. An access control method performed by a computer comprising a processor and a memory, comprising:
registering a dynamically fluctuating risk that has occurred during an operation of an apparatus accessing a system in a risk target list;
collecting and managing trail information concerning the apparatus which relates to the occurred risk from a trail management server which manages trail information of a supply chain using a block chain;
calculating a score of the apparatus based on the risk registered in the risk target list and the trail information concerning the apparatus;
determining a control method of an access by the apparatus to the system based on the score of the apparatus and a policy defining relationship between the score and the control method of an access; and
controlling the access by the apparatus to the system according to the control method of the access.

10. The access control method according to claim 9, wherein when it is determined by an information verification server which performs a verification of information determines that the trail information concerning the apparatus is not tampered, the calculating comprises calculating the score of the apparatus by updating the score of the apparatus in such way that a difference from an initial value becomes large when the trail information concerning the apparatus is a target of the risk registered in the risk target list.

11. The access control method according to claim 9, wherein when it is determined by an information verification server which performs a verification of information determines that the trail information concerning the apparatus is tampered, the calculating comprises calculating the score of the apparatus by updating the score of the apparatus in such way that a difference from an initial value becomes large.

12. The access control method according to claim 10, wherein the calculating comprises setting the initial value to the score when the risk has disappeared, and
wherein the controlling comprises removing the control of the access to the system by the apparatus.

13. The access control method according to claim 9, wherein the processor is configured to execute program instructions stored in the memory to perform:
receiving apparatus information from the apparatus and managing the apparatus information;
wherein the controlling and the collecting and managing comprise determining the apparatus according to the apparatus information.

14. The access control method according to claim 9, wherein the policy prescribes the control method of an access to the system for the score by the apparatus.

15. A computer-readable non-transitory recording medium recording a program, the program which causes a computer to perform processings of:
registering a dynamically fluctuating risk that has occurred during an operation of an apparatus accessing a system in a risk target list;
collecting and managing trail information concerning the apparatus which relates to the occurred risk from a trail management server which manages trail information of a supply chain using a block chain;
calculating a score of the apparatus based on the risk registered in the risk target list and the trail information concerning the apparatus;
determining a control method of an access by the apparatus to the system based on the score of the apparatus and a policy defining relationship between the score and the control method of an access; and
controlling the access by the apparatus to the system according to the control method of the access.

16. The medium according to claim 15, wherein when it is determined by an information verification server which performs a verification of information determines that the trail information concerning the apparatus is not tampered, the processing of calculating comprises calculating the score of the apparatus by updating the score of the apparatus in such way that a difference from an initial value becomes large when the trail information concerning the apparatus is a target of the risk registered in the risk target list.

17. The medium according to claim 15,
wherein when it is determined by an information verification server which performs a verification of information determines that the trail information concerning the apparatus is tampered, the processing of calculating comprises calculating the score of the apparatus by updating the score of the apparatus in such way that a difference from an initial value becomes large.

18. The medium according to claim 16,
wherein the processing of calculating comprises setting the initial value to the score when the risk has disappeared, and
wherein the controlling comprises removing the control of the access to the system by the apparatus.

19. The medium according to claim 15, wherein the program causes the computer to perform processing of receiving apparatus information from the apparatus and managing the apparatus information;
wherein the processings of controlling and the collecting and managing comprise determining the apparatus according to the apparatus information.

20. The medium according to claim 15,
wherein the policy prescribes the control method of an access to the system for the score by the apparatus.

* * * * *